Figure 1:
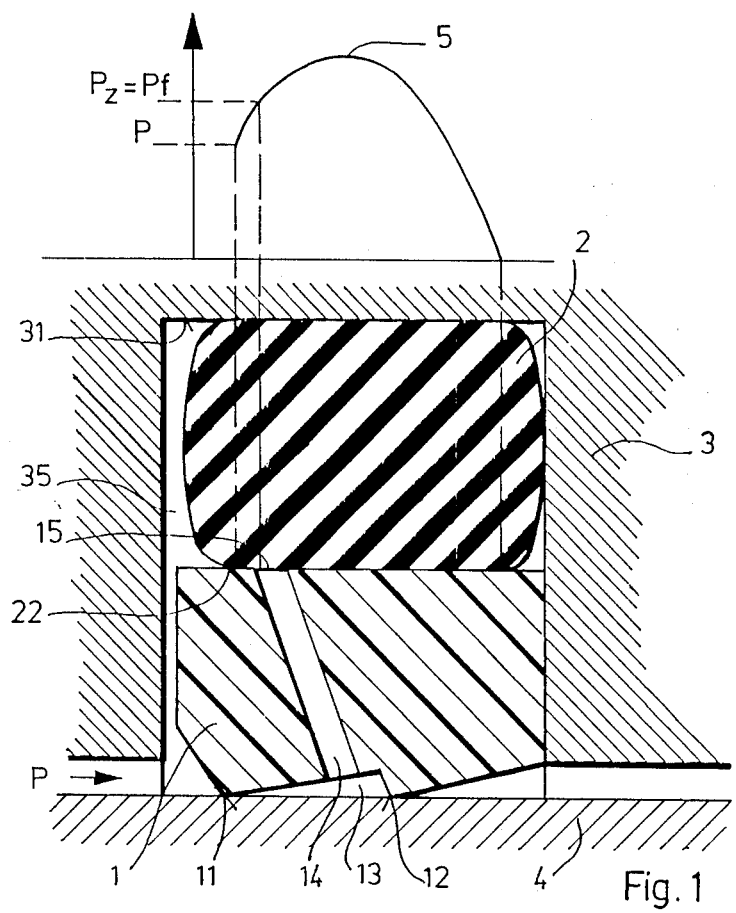

United States Patent [19]

Müller

[11] Patent Number: 4,723,782
[45] Date of Patent: Feb. 9, 1988

[54] ARRANGEMENT FOR SEALING A ROD

[75] Inventor: Heinz K. Müller, Waiblingen, Fed. Rep. of Germany

[73] Assignee: Busak + Luyken GmbH & Co., Stuttgart, Fed. Rep. of Germany

[21] Appl. No.: 63,496

[22] Filed: Jun. 16, 1987

[30] Foreign Application Priority Data

Jun. 19, 1986 [DE] Fed. Rep. of Germany ....... 3620539

[51] Int. Cl.⁴ .............................................. F16J 15/24
[52] U.S. Cl. ....................................... 277/75; 277/165; 277/205; 277/208
[58] Field of Search .................... 277/165, 205, 206 R, 277/207 R, 208, 70, 74-76

[56] References Cited

U.S. PATENT DOCUMENTS

| | | | |
|---|---|---|---|
| 2,937,061 | 5/1960 | Folkerts | 277/165 |
| 3,033,578 | 5/1962 | Kellogg | 277/165 X |
| 3,300,225 | 1/1967 | Shepler | 277/165 |
| 3,831,950 | 8/1974 | Bentley et al. | 277/75 |
| 4,252,331 | 2/1981 | Siegel | 277/165 X |

FOREIGN PATENT DOCUMENTS

| | | | |
|---|---|---|---|
| 3207327 | 3/1982 | Fed. Rep. of Germany | |
| 284580 | 4/1931 | Italy | 277/75 |

OTHER PUBLICATIONS

VIII.Internationale Dichtungstagung, 7.4.86 bo 8.4.86, Dresden, German Democratic Republic, Vorträge, Band I, "Tandem-Stangendichtungen in der Hydrauliktechnik", H. K. Müller, 14 pp.

Primary Examiner—Robert S. Ward
Attorney, Agent, or Firm—Fields, Lewis, Pittenger & Rost

[57] ABSTRACT

An arrangement for sealing that point at which the axially movable rod of a hydraulic device passes through its housing wall, comprises a sealing ring consisting of a tough-elastic plastic material or a harder elastomeric material and a stressing ring consisting of a softer elastomeric material, the two rings being accommodated jointly in a groove in the housing wall in such a manner that the sealing ring projecting from the groove is in contact with the axially moving rod, while the stressing ring seals the sealing ring against the circumferential face of the groove. The sealing ring is provided, on its inner surface facing the rod, with two axially offset annular sealing edges. The annular space between these two sealing edges is connected with the outer surface of the sealing ring by a channel. The channel opens at a point where it is covered by the stressing ring and which is located near the high-pressure end of the common contact face of the sealing ring and the stressing ring. The channel and the sealing stressing ring form together sort of a non-return valve which allows any pressure fluid that has entered the annular space to flow off the annular space, against the surface pressure exerted by the stressing ring on the opening of the channel, when the pressure that has built up in the annular space exceeds the surface pressure. In this manner, it is ensured that the pressure in the annular space can never reach a value that may cause the outer sealing edge to be lifted off and that may result in notable leakage.

5 Claims, 4 Drawing Figures

ARRANGEMENT FOR SEALING A ROD

The present invention relates to an arrangement for sealing that point at which the axially movable rod of a hydraulic device passes through its housing wall, comprising a sealing ring consisting of a tough-elastic plastic material or a harder elastomeric material and a stressing ring consisting of a softer elastomeric material, the two rings being accommodated jointly in a groove in the housing wall in such a manner that one end of the common contact face points towards the space to be sealed, the stressing ring being retained in sealing relationship between the circumferential face of the groove and the outer face of the sealing ring at an initial radial stress resulting from a certain oversize, and the sealing ring being provided, on its inner surface facing the rod, with two axially offset annular sealing edges being in sealing contact with the rod.

A sealing arrangement of this type comprising a so-called "double-edged ring" serves for implementing, in a simplified manner, the tandem principle which makes use of two sealing structures arranged one behind the other and having each only one sealing edge. The tandem principle has been described, for example, by H. K. üller in "Tandem-Stangendichtungen in der Hydrauliktechnik" ("Tandem rod seals in fluid technology"). VIIIth International Seal Congress, Dresden 1986 (KdT). The advantage provided by a sealing arrangement using a double-edged ring over a tandem arrangement is seen in the smaller space requirement and the lower production and assembly costs.

As in the case of a tandem arrangement, one encounters a similar phenomenon also with a double-edges ring: when the rod moves out of the space filled with the liquid, the drag flow produced by the moving rod raises a little the sealing edge adjacent the said space, giving rise to the formation of a gap between the sealing edge and the rod surface. As a result, fluid will collect in the annular space of the double-edges ring, because the fluid coat which is entrained through the gap is stripped off by the second sealing edge. The resulting accumulation of fluid in the annular space between the two sealing edges is, basically, desirable; for if the surfaces adjoining the sealing edges are designed in a suitable - known - manner, this permits in principle the accumulated fluid to be directly entrained back into the spaced filled with the liquid, when the rod moves back into the latter. A particularly thick oil film raising the sealing edge is obtained on the rod as it moves out of the oil-filled space when the oil is very cold and, consequently, extremely viscous. This is another reason which makes it appear advantageous to provide at least two sealing edges arranged one behind the other. The fluid friction produced in the oil film by the first sealing edge heats up the cold oil and improves thereby the stripping effect of the second sealing edge. Yet, the effect of sealing structures using double-edged rings is not as favorable as would be expected under the conditions explained above. This is due to the fact that the annular space defined by the two edges of a double-edges ring has only a relatively small volume so that in the presence of unfavorable operating conditions, the annular space may be completely filled with the entrained fluid already after a relatively short period of time. When under such circumstances additional fluid is entrained into the annular space, an intermediate pressure Pz which may be considerably higher than the pressure P of the fluid to be sealed off may build up directly in the annular space between the sealing edges. This is due on the one hand to the stripping effect of the outer sealing edge, i.e. the sealing edge on the low-pressure side, and on the other hand to the high flow resistance provided by the gap between the moving rod and the inner sealing edge through which—if the system is to remain tight—the entrained fluid would have to flow back into the space to be sealed off, in a direction contrary to that in which it had been entrained. Now, the intermediate pressure thus generated leads to hydraulic relief and, accordingly, a reduction of the pressure exerted by the sealing edges on the rod, which is rather undesirable and which may even lead to the outer sealing edge being drastically relieved, with the result that the thickness of the fluid film entrained past the outer sealing edge and into the pressureless environment rises drastically, too. However, since on the other hand the annular space between the sealing edges is partly drained by the dragging effect as the rod moves back into the space to be sealed off, the intermediate pressure occurring during this phase of the movement is only small so that a high contact pressure is obtained again between the outer sealing edge and the rod. Consequently, the thick fluid film adhering to the rod surface outside of the seal is stripped off by the sealing edge so that leakage occurs.

Now, it is the object of the present invention to improve a sealing structure of the type described above comprising a double-edged ring in such a manner as to avoid any risk of the outer sealing edge being lifted off the rod and accordingly, any leakage due to the small accumulation volume of the annular space defined by the two sealing edges.

This object is achieved according to the invention by the fact that the sealing ring comprises at least one channel connecting the annular space between the sealing edges with its outer surface and that each opening defined by the ends of such channels in the outer surface is covered by the stressing ring and located between the high-pressure end and the center of the common contact face of the sealing ring and the stressing ring.

The channel which, according to the invention, connects the annular space with the outer surface of the sealing ring and whose end is covered by the stressing ring acts in the manner of a relief valve. As soon as the intermediate pressure Pz prevailing in the annular space and, accordingly, also at the opening of the channel exceeds the surface pressure by which the stressing ring is in contact with the opening of the channel, the stressing ring is lifted off the said opening so that the fluid that had been entrained past the inner sealing edge and into the interspace is permitted to flow back into the space to be sealed off through the channel and the gap between the lifted stressing ring and the outer surface of the sealing ring. The sealing structure according to the invention provides the designer with a possibility of adjusting the difference between the intermediate pressure and the pressure of the fluid to be sealed off to a value ensuring that a sufficiently high contact pressure and, accordingly, the sealing effect of the outer sealing edge of the double-edged ring is maintained under any operating conditions. The contact pressure prevailing between the stressing ring and the sealing ring being determined by the location of the point where the channel ends in the outer surface of the sealing ring, the designer can determine the surface pressure exerted by the stressing ring upon the sealing ring and, thus, also upon the end of the channel by selecting an appropriate location for the point where the channel opens at the outer surface of the sealing ring. Consequently, it is also possible to select the location of the opening of the channel in such a manner that the surface pressure is only little higher than the pressure to be sealed off. On the other hand, however, it is always ensured that the surface pressure is higher than this latter pressure as the internal tension of the stressing ring will invariably be added to the pressure that acts upon the stressing ring and that has to be sealed off.

It is understood that, preferably, the sealing ring is provided with a plurality of channels distributed over its periphery so that only little flow resistance is offered to the returning fluid, which helps to keep small the difference between the intermediate pressure prevailing in the annular space and the pressure of the fluid to be sealed off.

According to a preferred embodiment of the invention, the outer face of the seals is provided with an annular groove into which the channels open and which is covered by the stressing ring over its full length. This annular groove may, advantageously, again be arranged close to that end of the contact surface between the sealing ring and the stressing ring which faces the space to be sealed off, in order to keep the pressure difference between the intermediate pressure and the pressure to be sealed off really small. The advantage of this embodiment of the invention lies in the fact that the fluid flowing back through the individual channels gathers initially in the annular groove before it is permitted to flow back into the space to be sealed off when the stressing ring is lifted off as a result of the exerted pressures.

According to a preferred embodiment of the invention, the sealing ring consists of two partial rings comprising one sealing edge each, and the channel is formed by a groove recessed into that end face of one of the two partial rings by which the same partial ring is in contact with the other partial ring. In the case of this embodiment of the invention, the partial rings are pressed together in the axial direction by the fluid to be sealed off; they are in contact by flat or conical end faces which form together the parting line of the two partial rings and which contain the grooves forming the channels. The advantage of this embodiment of the invention is seen in the fact that is simplifies the production of the radial channels and provides an improved possibility of sizing the two partial rings separately in an optimum manner.

The application of the invention is not restricted to sealing structures where the sealing ring comprises a cylindrical surface as contact face for the stressing ring; rather, it can be applied also to sealing structures using a sealing ring with a profiled outer surface which may serve to distribute the pressure of the stressing ring over the sealing ring in a pre-determined manner. The invention may even be applied to sealing structures of the type where the sealing ring comprises an area arranged between the stressing ring and the circumferential face of the groove and forming, together with the area provided with the sealing edges, a groove opening towards the high-pressure end and accommodating the stressing ring. While in this case the stressing ring is supported by the groove not directly, but via a corresponding area of the sealing ring, the basic function of the sealing structure remains unchanged. On the other hand, a new field of application is opened up in this manner for the seal according to the invention, namely the field of the so-called grooved rings comprising an "inserted" O ring. Here, too, the channels covered by the elastomeric O ring can lead to a notable improvement of the sealing effect.

The invention will be described hereafter in detail with reference to the example illustrated in the drawing. The features shown in the drawing and described in the specification may be used in other embodiments of the invention either individually or in any desired combination thereof. In the drawing FIG. 1 is a diagrammatic representation showing a crosssection through a sealing structure according to the invention, intended to illustrate the operation of the seal, combined with a curve of the pressures encountered at the illustrated seal; and FIGS. 2 to 4 show cross-sections similar to that of FIG. 1, but through other sealing structures according to the invention.

The sealing structure shown in FIG. 1 comprises a sealing ring 1 and a stressing ring 2 which are both accommodated, in co-axial relationship relative to each other, in the groove 35 of a housing wall 3 so that the sealing edges 11, 12 provided on the inner face of the sealing ring 1 is in contact with the circumferential face of a rod 4 passing through the housing wall 3, while the stressing ring 2 is arranged between the circumferential face 31 of the groove 35 and the outer face 21 of the sealing ring. The sealing ring 1 and the stressing ring 2 are loaded and urged to the right, against the flank of the groove 35, by the fluid left of the sealing structure which is subjected to a pressure P. During outward movement of the rod 4, a hydrodynamic gap forms at the sealing edge 11 on the high-pressure end, through which fluid is entrained into the annular space 13 between the two sealing edges 11, 12, due to a drag flow occurring at this point. In consequence of the sealing effect of the sealing edge 12 on the low-pressure end, the annular space 13 and a channel 14 connecting the said annular space with the outer face 21 of the sealing ring 1 get filled with fluid. As further fluid is dragged in, an intermediate pressure $P_z$ builds up in the annular space 13 and the channel 14. The stressing ring 2 is in contact with the whole outer face 21 of the sealing ring 1 due to a certain oversize and, additionally, due to the effect of the pressure P to be sealed off, the curve of the surface pressure being determined by the shape, the modulus of elasticity and the oversize of the stressing ring 2. The development of the surface pressure is illustrated by curve 5 in the diagram forming part of FIG. 1. Initially, the opening 15 of the channel 14 is closed tightly by the stressing ring 2. However, when the intermediate pressure $P_z$ prevailing in the annular space 13 and the channel 14 exceeds the value of the surface pressure F exerted by the stressing ring 2 at the opening 15 of the channel 14, the stressing ring 2 is lifted off locally by the fluid in the channel 14, and the latter flows back to the high-pressure end and into the fluid-filled space of the groove 35 in which the pressure P prevails. Accordingly, the arrangement works in the manner of a relief valve. The development of the surface pressure between the stressing ring and the sealing ring 1, illustrated in FIG. 1 by way of example by curve 5, reflects approximately the conditions that will be obtained when an O ring is used as a stressing ring 2. In the case of curve 5, the peak surface pressure is encountered approximately at the center of the contact face 22 between the stressing ring 2 and the sealing ring 1. By arranging the opening 15 of the channel 14 between this center and the high-pressure end of the contact face 22, as provided by the invention, it is ensured that the surface pressure Pf encountered at the opening 15 is only slightly higher than the pressure P of the fluid to be sealed off. It is thus ensured under any operating conditions that the maximum intermediate pressure Pz can rise only insignificantly above the pressure to be sealed off.

Figure 2:
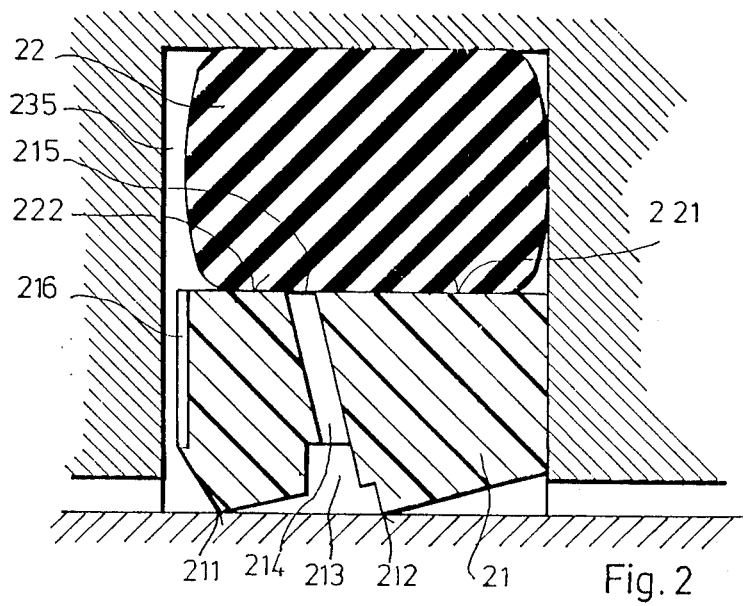

FIG. 2 shows a sealing structure comprising a one-piece sealing ring 21 and a stressing ring 22 that differ from the embodiment of FIG. 1 only by the fact that the annular space 213 between the inner sealing edge 211 and the outer sealing edge 212 comprises a groove-like extension and that, in addition, radial grooves 216 are recessed into the end face of the sealing ring 21 facing the space to be sealed off, which grooves 216 ensure in any case that the portion of the groove 235 accommodating the stressing ring 22 is accessible for the fluid to be sealed off which is pressurized at the pressure P. The operation of this seal is the same as that described for the seal illustrated in FIG. 1.

Figure 3:
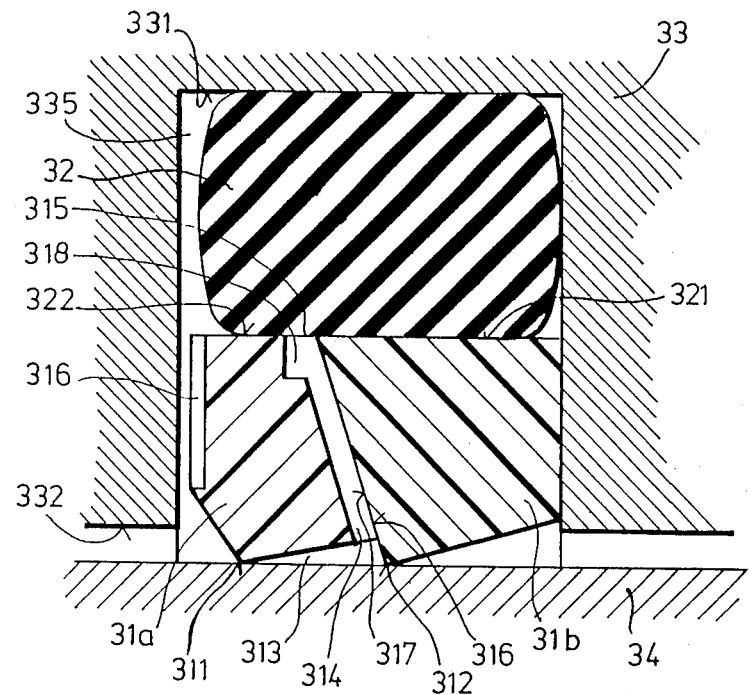
Figure 4:
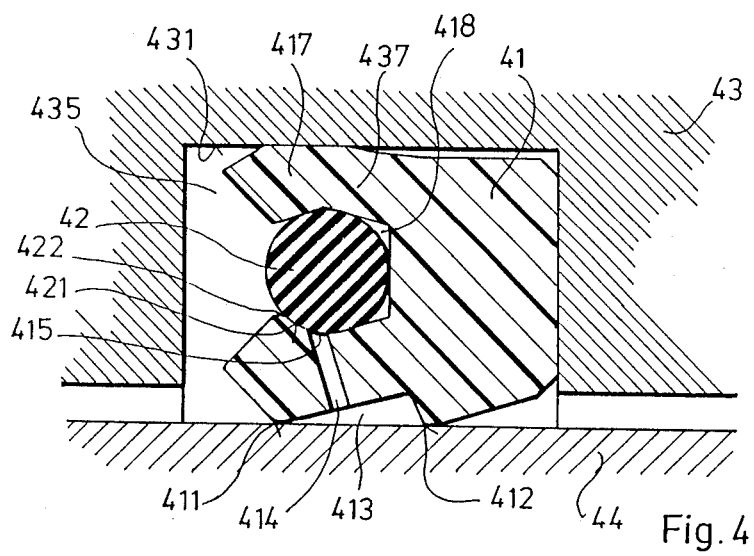

FIG. 3 shows an embodiment of the sealing structure in which the sealing ring consists of two partial rings 31a and 31b. The two partial rings and the stressing ring 32 are again installed commonly in a groove 335 in the housing wall 33. The fluid to be sealed off enters the groove 335 through the bore 332 in the housing. The partial ring 31a is provided with a sealing edge 311 and with a convex, conical end face 316 by which it is in contact with a matching conical end face 317 of the other partial ring 31 which likewise comprises the sealing edge 312. The two sealing edges 311 and 312 form again between them an annular space 313, with a channel 314 extending from the said annular space 313 to an annular groove 318 arranged on the outer face 321 of the sealing ring and formed by a step recessed into the end face 316 of the first partial ring 31a. The openings 315 of the channels 314 are located in the area of this annular groove 318. The stressing ring 32 is fitted with a certain oversize in the space between the outer circumferential face 331 of the groove 335 and the outer face 321 of the sealing ring formed by the partial rings 31a and 31b. The annular groove 315 is arranged between the high-pressure end 322 of the common contact face between the stressing ring 32 and the partial rings 31a, 31b—i.e. on the end of the said contact face at the side of the partial ring 31a—and the center of the same contact face. The end face of the sealing ring facing the space to be sealed off is again provided with recessed radial grooves 316.

In the case of the embodiment shown in FIG. 4, the sealing ring 41 fitted in a groove 435 of the housing wall 43 is designed in the manner of a grooved ring comprising an area 437 which is in contact with the circumferential face 431 of the groove 435, which area defines together with the remaining portion of the sealing ring 41 a groove 418 which is open towards the high-pressure side and into which an O ring 42 serving as a stressing ring has been inserted. This rubber-elastic stressing ring 42 is again fitted in the groove 418 of the sealing ring 41 at a certain initial tension so that on the one hand it urges the area 437 of the sealing ring against the circumferential face 431 of the groove 435, in sealing relationship, while simultaneously pressing the sealing ring, which is again provided with two sealing edges 411, 412 arranged axially one behind the other, against the shaft 44 to be sealed off. It appears that this embodiment of the sealing structure differs from the embodiments described before substantially only by the fact that the stressing ring 42 bears upon the circumferential face 431 of the groove 435 not directly, but through a resilient area 437 of the sealing ring 41.

Just as in the embodiments described before, the annular space 413 arranged between the two sealing edges 411 and 412 is again connected, via a channel 414, with the outer face 421 of the portion of the sealing ring 41 loaded by the stressing ring 42, and the sealing ring 41 again covers the openings 412 of the channels. The opening of the channels is again arranged in an area of the contact face 422 located between the center and the high-pressure end 422 of the same contact face. Accordingly, it is ensured in the case of this embodiment of the invention, too, that fluid that has been entrained into the annular space 413 can escape from the annular space through channels 414 when the intermediate pressure Pz prevailing in this annular space exceeds the surface pressure Pf exerted by the stressing ring 42 at the points of the openings of the channels 414. And again, it is possible to ensure by proper selection of the position of the openings 415 relative to the common contact face that the surface pressure Pf and, thus, the arising intermediate pressure Pz is only little higher than the pressure P of the fluid to be sealed off.

It appears from the described embodiments that the invention can be applied to sealing structures of the most different types and that the man of the art will have many possibilities of arranging a channel provided with sort of a relief valve using a stressing ring, in all cases where a space defined by sealing edges and permitting a fluid, which is to be sealed off, to gather at an overpressure, is to be relieved from such overpressure by returning the fluid into the high-pressure space.

I claim:

1. In a hydraulic device comprising a wall separating a high pressure area from a low pressure area, an opening in said wall which has a cylindrical surface, an annular groove provided in said surface, an axially movable rod traversing said opening, said rod and the cylindrical surface of said opening defining an annular space, a sealing arrangement positioned in said annular space between said rod and said surface, said sealing arrangement comprising a sealing ring consisting of a tough-elastic plastic material including harder elastomeric materials and a stressing ring consisting of a softer elastomeric material, the two rings being acommodated jointly in said groove in such a manner that one end of their common contact face points towards the high pressure area, the stressing ring being retained in sealing relationship between the circumferential face of said groove and the outer face of the sealing ring at an initial radial stress resulting from a certain oversize, and the sealing ring being provided, on its inner surface facing the rod, with two axially offset annular sealing edges being in sealing contact with the rod, wherein the said sealing ring comprises at least one channel connecting the annular space between the sealing edges with its outer surface and each opening defined by the end of said channel in the outer surface is covered by the said stressing ring and located between the highpressure end and the center of the common contact face of the said sealing ring and the said stressing ring.

2. Arrangement according to claim 1, wherein the said sealing ring is provided with a plurality of channels and the outer face of the said sealing ring is provided with an annular groove into which the said channels open and which is covered by the said stressing ring over its full length.

3. Arrangement according to claim 2, wherein the said sealing ring consists of two partial rings comprising one sealing edge each, and the said channels are formed by grooves which, just as the annular groove connecting the channels, are recessed into that end face of one of the said two partial rings by which the same partial ring is in contact with the other partial ring.

4. Arrangement according to claim 2, wherein the said sealing consists of two partial rings comprising one sealing edge each, and the at least one channel is formed by a groove recessed into that end face of one of the said two partial rings by which the same partial ring is in contact with the other partial ring.

5. Arrangement according to any of the preceding claims, wherein the said sealing ring comprises an area arranged between the said stressing ring and the circumferential face of the said groove and forming, together with the area provided with the said sealing edges, a groove opening towards the high-pressure end and accommodating the said stressing ring.

* * * * *